US008835041B2

(12) United States Patent
Johnson et al.

(10) Patent No.: US 8,835,041 B2
(45) Date of Patent: Sep. 16, 2014

(54) ELECTRODE MATERIALS FOR SODIUM BATTERIES

(75) Inventors: Christopher S. Johnson, Naperville, IL (US); Sun-Ho Kang, Naperville, IL (US); Donghan Kim, Darien, IL (US); Mahalingam Balasubramanian, Naperville, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 916 days.

(21) Appl. No.: 13/006,512

(22) Filed: Jan. 14, 2011

(65) Prior Publication Data
US 2012/0183837 A1    Jul. 19, 2012

(51) Int. Cl.
*H01M 10/056*    (2010.01)
*H01M 10/02*    (2006.01)
*H01M 4/52*    (2010.01)
*H01M 4/505*    (2010.01)
*H01M 4/50*    (2010.01)
*H01M 4/36*    (2006.01)
*H01M 10/39*    (2006.01)
*H01M 4/48*    (2010.01)
*H01M 6/42*    (2006.01)

(52) U.S. Cl.
CPC ............... *H01M 10/39* (2013.01); *Y02E 60/12* (2013.01); *H01M 4/502* (2013.01); *H01M 6/42* (2013.01); *H01M 4/523* (2013.01); *H01M 4/366* (2013.01); *H01M 4/483* (2013.01)
USPC ........... 429/156; 429/188; 429/223; 429/224; 429/231.9; 429/231.95; 252/182.1

(58) Field of Classification Search
USPC .............. 429/188, 341, 223, 231.1, 221, 156, 429/224, 231.9, 231.95; 29/623.5; 252/182.1; 423/594.4, 594.6
See application file for complete search history.

(56) References Cited

U.S. PATENT DOCUMENTS 4,070,527 A    1/1978    King et al.
7,695,868 B2    4/2010    Inoue et al.
(Continued)

FOREIGN PATENT DOCUMENTS

WO    WO 2007/041209 A2    4/2007

OTHER PUBLICATIONS

K. Kang et al., Electrodes with High Power and High Capacity for Rechargeable Lithium Batteries, Science, vol. 311 (2006) 977-980.
(Continued)

*Primary Examiner* — Kenneth Douyette
(74) *Attorney, Agent, or Firm* — Olson & Cepuritis, Ltd.

(57) ABSTRACT

The present invention provides an electrode material suitable for use as a cathode in a sodium electrochemical cell or battery, the electrode comprising a layered material of formula $Na_cLi_dNi_eMn_fM_zO_b$, wherein M comprises one or more metal cation, $0.24 \le c/b \le 0.5$, $0 < d/b \le 0.23$, $0 \le e/b \le 0.45$, $0 \le f/b \le 0.45$, $0 \le z/b \le 0.45$, the combined average oxidation state of the metal components (i.e., $Na_cLi_dNi_eMn_fM_z$) is in the range of about 3.9 to 5.2, and b is equal to $(c+d+Ve+Xf+Yz)/2$, wherein V is the average oxidation state of the Ni, X is the average oxidation state of the Mn, and Y is the average oxidation state of the M in the material. The combined positive charge of the metallic elements is balanced by the combined negative charge of the oxygen anions, the Na is predominately present in a sodium layer, and the Mn, Ni, and M are predominately present in a transition metal layer.

22 Claims, 10 Drawing Sheets

(56) References Cited

U.S. PATENT DOCUMENTS

| | | |
|---|---|---|
| 2007/0218361 A1 | 9/2007 | Inoue et al. |
| 2009/0155691 A1 | 6/2009 | Park et al. |
| 2010/0248023 A1* | 9/2010 | Tsuruta et al. ............ 429/188 |
| 2010/0248040 A1* | 9/2010 | Saito et al. ............... 429/341 |

OTHER PUBLICATIONS

W. Tahil, www.evworld.com/article.cfm?storyid=1180, Jan. 28, 2007 "Peak Lithium".

J. Barker et al., A Sodium-Ion Cell Based on the Fluorophosphate Compound NaVPO4F, Electrochemical and Solid State Letters, vol. 6 (1) A1-A4 (2003).

J. Barker et al., A Comparative Investigation of the Li Insertion Properties of the Novel . . . , Journal of the Electrochemical Society, vol. 151 (10) A1670-A1677 (2004).

B. L. Ellis et al., Crystal Structure and Electrochemical Properties of A2MPO4F Fluorophosphates . . . Chem. Mater., vol. 22, (3)1059-1070 (2010).

N. Recham et al., Ionothermal Synthesis of Sodium-Based Fluorophosphate Cathode Materials, Journal of the Electrochemical Society, vol. 156 (12) A993-A999 (2009).

S. Komaba et al., Electrochemical Intercalation Activity of Layered NaCrO2 vs. LiCrO2, Electrochemistry Communications, vol. 12, 355-358 (2010).

J. Kim et al., the Discharge Properties of Na/Ni3S2 Cell at Ambient Temperature, Journal of Power Sources, vol. 178, 852-856 (2008).

Y. Uebou et al., Electrochemical Insertion of Lithium and Sodium Into (MoO2) 2P2O7, Journal of Power Sources, vol. 115 , 119-124 (2003).

M. Nishijima et al., Cathode Properties of Metal Trifluorides in Li and Na Secondary Batteries, Journal of Power Sources, vol. 190, 558-562 (2009).

K. West et al., Sodium Insertion in Vanadium Oxides, Solid State Ionics 28-30, 1128-1131 (1988).

T. Shiratsuchi et al., FePO4 Cathode Properties for Li and Na Secondary Cells, Journal of Power Sources, vol. 159, 268-271 (2006).

Z. Lu et al., In Situ X-Ray Diffraction Study of P2—Na2/3[Ni1/3Mn2/3]O2, Journal of the Electrochemical Society, vol. 148 (11), A1225-A1229 (2001).

M. M. Doeff et al., Orthorhombic NaxMnO2 as a Cathode Material for Secondary Sodium and Lithium Polymer Batteries, J. Electrochem. Soc., vol. 141, 11, L145-L147 (1994).

A. Caballero et al., Ion-Exchange Properties of P2—NaxMnO2: Evidence of the Retention of the Layer Structure Based . . . Journal of Solid State Chemistry, vol. 174, 365-371 (2003).

A. Caballero et al., Synthesis and Characterization of High-Temperature Hexagonal P2—Na0.6 MnO2 and its Electrochemical Behaviour . . . J. Mater. Chem., vol. 12, 1142-1147 (2002).

W-S Yoon et al., Local Structure and Cation Ordering in O3 Lithium Nickel Manganese Oxides with Stoichiometry . . . Eletrochemical and Solid-State Lett, 7 (7)A167-A171 (2004).

M.S. Whittingham, Lithium Batteries and Cathode Materials, Chemical Reviews, vol. 104, 10, 4271-4301 (2004).

B. Ravel et al., Athena, Artemis, Hephaestus: Data Analysis for X-ray Absorption Spectroscopy Using IFEFFIT, Journal Synchrotron Radiation, vol. 12, 537-541 (2005).

* cited by examiner (a)

(b)

ELECTRODE MATERIALS FOR SODIUM BATTERIES

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to energy storage devices, notably non-aqueous electrochemical cells and batteries and, more particularly, non-aqueous sodium electrochemical cells and batteries.

BACKGROUND

The need for energy storage and its rising demand has become a major concern that the world faces today and going forward into the future. Importantly, electrical grid storage in a range of scaled sizes will be increasingly necessary as green technologies such as wind power, and solar energy conversion become more prevalent. Presently, the options for electrical grid storage consist of pumped-storage hydro, compressed air storage, advanced flywheels, thermal sinks, and flow batteries. All these technologies have their merits and limitations. Also, conventional batteries, such as Pb-acid, Ni—Cd, and high-temperature sodium batteries of the type Na—S and Na—NiCl$_2$, which use a molten sodium anode and operate at about 300-500° C., have also been utilized. These technologies all have their shortcomings, and perhaps the greatest is in terms of up-front capital and engineering costs. For example, the high-temperature batteries need to have expensive thermal management engineered components. In contrast, ambient temperature sodium batteries are a relatively new energy storage system that has been increasingly interesting and attractive due to the promise of low cost due to the great abundance of sodium. Abundant sodium would also provide an alternative chemistry to lithium batteries, and may therefore alleviate concerns regarding limited lithium reserves in the world [1].

The science and engineering of Li-ion batteries in various energy storage applications are quite developed. In contrast, the body of literature and the knowledge of basic and applied research on ambient temperature sodium and sodium-ion batteries are lacking New sodium and sodium-ion battery materials that can satisfy the need for energy storage and its rising demand, and which provide an alternative to lithium are difficult to find. In a sodium electrochemical system, perhaps the greatest technical hurdle to overcome is the lack of a high-performance cathode material that is easy to synthesize, safe, non-toxic, and low cost. The opportunity in this area is to develop a new cathode material that meets all of these criteria. Development of a new cathode would help enable the use of an ambient temperature sodium and sodium-ion battery on a large scale for electrical grid storage. In addition, if the cost and safety are suitable, then transportation application, and other energy storage applications can be utilized, particularly if the energy density of the sodium and sodium-ion battery can be improved.

Ambient temperature Na and Na-ion batteries are at their infancy, so new materials to enable Na and Na-ion electrochemistry and new redox couples could be numerous. Non-aqueous electrolyte ambient temperature sodium and sodium-ion batteries have electrochemical similarity to lithium and Li-ion batteries. While the voltage of Na/Na$^+$ is only about 300 mV less positive than Li/Li$^+$, the Na molecular weight of about 23 g/mol is much higher than that of Li (about 7 g/mol). Therefore new materials for Na and Na-ion batteries must have a desirable suite of attractive qualities to justify their implementation.

Some examples of sodium cathode materials are sodium vanadium phosphate fluoride-type material, NaVPO$_4$F, used in sodium-ion cells [2,3], and lithium sodium vanadium phosphate fluoride [4] used in mixed lithium and sodium containing electrolytes, as well as Na$_2$MPO$_4$F (M=Fe, Mn) materials [5]. An interesting Na battery study using NaCrO$_2$ was recently reported [6]. Unique reversible Cr(III/IV) oxidation state changes were observed. However, from a practical and environmental standpoint, NaCrO$_2$ is difficult to handle and Cr(VI) is considered toxic.

Other exotic materials such as Ni$_3$S$_2$ [7], (MoO$_2$)$_2$P$_2$O$_7$ [8], and Fe$_3$F—C materials [9] have been tested in sodium batteries, but these do not perform as well as desired and are difficult to process. Sodium vanadium oxides (e.g., NaV$_3$O$_8$) are also known in electrochemical Na cells [10], but the use of vanadium is not favorable due to toxicity concerns. Shiratusuchi et al. has suggested the use of FePO$_4$ in sodium-ion (Na-ion) cells [11], but data on only two cycles and at 350° C. was provided. Lu and Dahn previously reported that P2-layered Na$_{2/3}$[Ni$_{1/3}$Mn$_{2/3}$]O$_2$ with space group (S.G.) P6$_3$mmc could reversibly exchange Na in sodium cells [12], but the voltage profile was complicated, showing single and two phase regions, and conversion to O2 structure [12] at high states of charge. In addition, these materials were difficult to synthesize, e.g., requiring temperatures as high as 900° C. with liquid nitrogen quenching. For Mn-only layered oxide compounds, examples include earlier works on Na$_x$MnO$_2$ [13], Na$_{0.6}$MnO$_2$ and Na$_{0.75}$MnO$_2$, [14]. It appears that a phase change to amorphous character and a loss of capacity occurs during cycling of such materials [15].

Rechargeable ambient temperature sodium and sodium-ion cells and batteries can be used for many energy storage applications, particularly electrical grid storage technologies. Other applications are possible for ambient temperature sodium and sodium-ion batteries including, but not limited to portable consumer products, tools, medical products, defense products, transportation, and aerospace products and other energy storage devices. There is an ongoing need for new cathode materials for sodium electrochemical cells and batteries. The present invention addresses this need.

SUMMARY OF THE INVENTION

In this invention mixed sodium-lithium nickel-manganese metal oxide layered materials have been identified for use as cathodes in ambient temperature sodium and sodium-ion batteries.

This invention relates to electrodes for sodium and sodium-ion cells and batteries comprising sodium/transition metal oxide electrode materials that also contain lithium. In one embodiment, the invention provides an electrode material with composition Na$_c$Li$_d$Ni$_e$Mn$_f$M$_z$O$_b$, wherein M is a metal cation, $0.24 \leq c/b \leq 0.5$, $0 < d/b \leq 0.23$, $0 \leq e/b \leq 0.45$, $0 \leq f/b \leq 0.45$, $0 \leq z/b \leq 0.45$, the combined average oxidation state of the metal components (i.e., Na$_c$Li$_d$Ni$_e$Mn$_f$M$_z$) is in the range of about 3.9 to 5.2, and b is equal to (c+d+Ve+Xf+Yz)/2, wherein V is the average oxidation state of the Ni, X is the average oxidation state of the Mn, and Y is the average oxidation state of the M in the material. The values of c, d, e, f, and z depend on the proportions and average oxidation states of the metallic elements in the composition, such that the combined positive charge of the metallic elements is balanced by combined negative charge of the oxygen anions. The electrode material has a layered structure in which the sodium is predominately in a sodium layer, while the Li, Mn, Ni, and M ions are predominately contained in a transition metal (TM) layer. The lithium in the transition metal layer is an important feature for the practical operation of the electrode, and the location of the lithium has been experimentally deduced by the presence of a voltage plateau at about 4.5 V vs. Li metal, in a lithium cell comprising a lithium-containing electrolyte. The oxidation states of the Ni and Mn components are predominantly divalent and tetravalent, respectively. The electrode material can be prepared by thermal reaction of co-precipitated transition metal carbonate precursors combined with sodium carbonate and lithium carbonate. Preferably, the $Na_cLi_dNi_eMn_fM_zO_b$ is present in a layer or coating on a current collector such as a metallic substrate (e.g., a plate or foil).

Electrodes of this invention possess high-energy and high-power capabilities and can be used in rechargeable sodium and sodium-ion cells and batteries that include a suitable anode and electrolyte (e.g., sodium metal anode and sodium salt electrolyte) to form a full cell that is most preferably used in ambient-temperature sodium and sodium-ion cells and batteries.

Since the cathodes are rich in sodium and manganese, they are expected to be low in cost compared to similar lithium metal oxide materials. The cathode materials can be easily synthesized, and exhibit high rates, high energy, and long cycle lifetimes in electrochemical cells. Such advances may enable the widespread use of sodium and sodium-ion batteries for many applications.

The first electrochemical charge of a cathode of the invention in a lithium battery electrolyte with Li metal as the anode typically exhibits a voltage plateau at about 4.5 V, which is indicative of the presence of Li in the transition metal layer. This serves to stabilize the structure and allows for free mobility of sodium ions in a single phase intercalation reaction with very reversible cycling of the battery at a capacity of about 100 to about 115 mAh/g.

Non-limiting examples of cathode materials of the present invention have been prepared, which have the general composition $Na_cLi_dNi_eMn_fM_zO_b$, where the ratio f/e is about 3, c/d is about 5 or about 3, and (c+d)/(e+f) is about 1.2. For convenience these materials are also referred to herein as $Na_{0.9}Li_{0.3}[Ni_{0.25}Mn_{0.75}]O_b$ and $Na_{1.0}Li_{0.2}[Ni_{0.25}Mn_{0.75}]O_b$, respectively. These materials have layered structures and were investigated as cathode active materials for sodium and sodium-ion batteries. In these examples, the Na cations are predominately present in trigonal prismatic coordination, and the lithium cations preferentially are located in octahedral coordination in the transition metal layer along with the Mn, Ni, and M ions. Preferably, site disorder between the Na and the other metal cations is minimal. The metal stoichiometries were selected to include Li so that stabilization of a charge-ordering state between Li and the transition metals in the TM layer will occur. This structural/electronic property relationship has been experimentally analyzed [16] and comprehensively discussed in the context of lithium battery cathodes [17]. In lithium batteries, the charge-ordered state is known to stabilize the structure to reversible insertion/extraction of lithium between the TM layers.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF THE PREFERRED EMBODIMENTS

Figure 1:
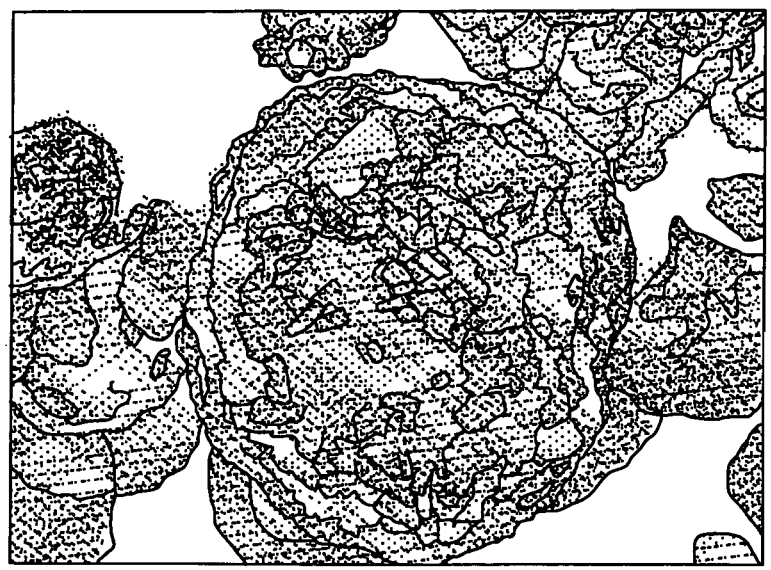
FIG. 1 depicts (a) a SEM of $Na_{1.0}Li_{0.2}Ni_{0.25}Mn_{0.75}O_b$, in which the overall range of particles and sizes ranges from about 5 to about 20 microns; (b) a schematic representation of the $Na_{1.0}Li_{0.2}Ni_{0.25}Mn_{0.75}O_b$ structure, which is layered with sodium cations in the prismatic coordination between the close-packed stacked oxygen anions layers; the crystal structure contains a hexagonal unit cell with AABB close-packed oxygen anions.
Figure 1:
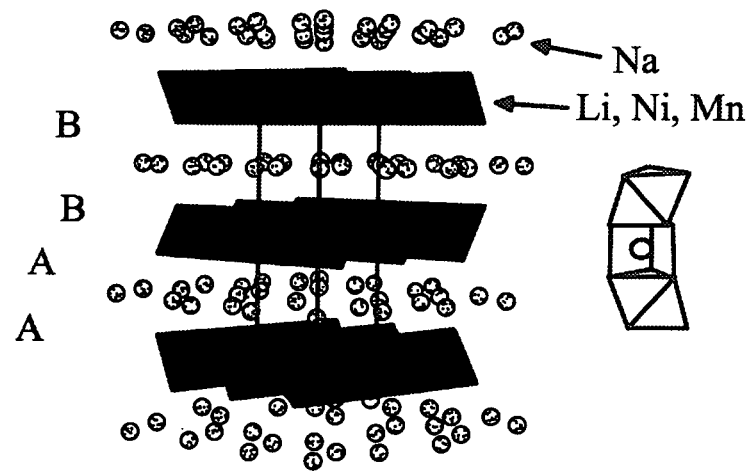

This invention relates to energy storage devices, notably non-aqueous electrochemical cells and batteries and, more particularly, non-aqueous rechargeable sodium and sodium-ion electrochemical cells and batteries. Such cells can operate at ambient temperature. These rechargeable sodium and sodium-ion cells and batteries may be used for many energy storage applications, particularly electrical grid storage technologies. Other applications are possible for sodium and sodium-ion batteries including, but not limited to portable consumer products, tools, medical products, defense products, transportation, and aerospace products and other energy storage devices.

In one embodiment, this invention provides an electrode for sodium or sodium ion electrochemical cell and batteries. The electrode comprises a material of composition $Na_cLi_d Ni_e Mn_f M_z O_b$, wherein M is a metal cation, $0.24 \le c/b \le 0.5$, $0 < d/b \le 0.23$, $0 \le e/b \le 0.45$, $0 \le f/b \le 0.45$, $0 \le z/b \le 0.45$, the combined average oxidation state of the metal components (i.e., $Na_c Li_d Ni_e Mn_f M_z$) is in the range of about 3.9 to 5.2, and b is equal to $(c+d+Ve+Xf+Yz)/2$, wherein V is the average oxidation state of the Ni, X is the average oxidation state of the Mn, and Y is the average oxidation state of the M. The values of c, d, e, f, and z depend on the proportions and average oxidation states of the metallic elements in the material such that the combined positive charge of the metallic elements is balanced by the combined negative charge of the oxygen anions in the material. The electrode material of composition $Na_c Li_d Ni_e Mn_f M_z O_b$ is layered, with preferably good separation between the layers. Preferably, Na predominately is present in a sodium layer, and Li predominately is present in a transition metal (TM) layer along with the Mn, Ni, and M ions. In a preferred embodiment, little or no site-disorder takes place between the Na in the sodium layer, and the Li, Mn, Ni and the other M metals in the transition metal layer. The presence of Li in the TM layer beneficially leads to excellent electrochemical performance. In some preferred embodiment, the $Na_c Li_d Ni_e Mn_f M_z O_b$ is present within a layer or coating on a metallic substrate (e.g., aluminum, copper, and the like).

The particularly preferred embodiment of an electrode of the invention comprises an active material of composition $Na_c Li_d Ni_e Mn_f M_z O_b$ wherein $c/b \le 0.4$, and $(e+f+z)/(c/b)$ is about 2.5. In one preferred embodiment, z/b is 0, (c+d)/b is about 0.51, and (e+f)/b is about 0.42. In another preferred embodiment, f/b is 0.

In some preferred embodiments, M comprises at least one cation selected from the group consisting of $Mg^{2+}$, $Co^{2+}$, $Co^{3+}$, $B^{3+}$, $Fe^{2+}$, $Fe^{3+}$, $Ga^{3+}$, $Al^{3+}$, and $Ti^{4+}$.

Preferably, the Li of the electrode material is predominantly present in the transition metal layer. The Na in the sodium layer preferably has predominately trigonal prismatic coordination, while the Li predominantly is present in the transition metal layer, which makes local $Li_2MnO_3$-like character in the transition metal layer and preferably clusters with Ni and/or Mn. Preferably, the $Na_c Li_d Ni_e Mn_f M_z O_b$ exhibits a layering peak in the X-ray diffraction (XRD) pattern thereof, and also preferably has a repeating AABB layered, oxygen close-packed stacking structure.

In one preferred embodiment discussed above, ratio f/e is about 3, c/d is about 5 or about 3, and (c+d)/(e+f) is about 1.2, and preferably, the oxidation state of Mn in the $Na_c Li_d Ni_e Mn_f M_z O_b$, as determined by a X-ray absorption near-edge spectrum (XANES), is about (IV). The oxidation state of Mn in the $Na_c Li_d Ni_e Mn_f M_z O_b$, as determined by a X-ray absorption near-edge spectrum (XANES), preferably is about (IV) after a charge to about 4.2 V vs. Na metal, followed by a discharge to 2.0 V vs. Na metal, in a sodium electrochemical cell.

In some preferred embodiments, the charge-discharge profile of the electrode exhibits a plateau at about 4.5 V when used as the cathode in an electrochemical cell comprising a Li metal anode and an electrolyte comprising 1.2 M $LiPF_6$ in a mixture of ethylenecarbonate (EC) and ethylmethylcarbonate (EMC) in a weight ratio of about 3:7 EC:EMC.

The material of composition $Na_c Li_d Ni_e Mn_f M_z O_b$ may be prepared by a number of different procedures, including sol-gel, polyol, and hydrothermal methods. Calcination and sintering of any suitable mixed combination of salts, oxides, carbonates, hydroxides, or other staring materials comprising Na, Li, Mn, Ni and M can also be used to prepare the material. For example, such starting materials can be mixed in a slow rotation mixer for a suitable period of time (e.g., about 16 to 20 hours), followed by grinding and thermal reaction of the mixture. In one preferred embodiment, the material is prepared by pyrolysis of a combination of sodium and lithium carbonates and a co-precipitated precursor Mn/Ni carbonate, thereby releasing carbon dioxide as shown in Equation (1).

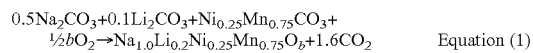

$0.5Na_2CO_3 + 0.1Li_2CO_3 + Ni_{0.25}Mn_{0.75}CO_3 +$
$\frac{1}{2}bO_2 \rightarrow Na_{1.0}Li_{0.2}Ni_{0.25}Mn_{0.75}O_b + 1.6CO_2$     Equation (1)

Optionally, one or more additional metal carbonates (M carbonate) can be included in the reaction of Equation (1), with appropriate adjustment of the stoichiometries of the precursor carbonates. The temperature of the pyrolysis is selected such that the mixture of precursor carbonates decomposes to the active layered phase for the electrode material. In a preferred embodiment the pyrolysis is performed at a temperature above about 500° C. The stoichiometries of the carbonates are selected such that a material of composition $Na_c Li_d Ni_e Mn_f M_z O_b$ is formed in which $0.24 \le c/b \le 0.5$, $0 < d/b \le 0.23$, $0 \le e/b \le 0.45$, $0 \le f/b \le 0.45$, $0 \le z/b \le 0.45$, the combined average oxidation state of the metal components (i.e., $Na_c Li_d Ni_e Mn_f M_z$) is in the range of about 3.9 to 5.2, and b is equal to $(c+d+Ve+Xf+Yz)/2$, wherein V is the average oxidation state of the Ni, X is the average oxidation state of the Mn, Y is the average oxidation state of the M, and Li preferably predominately is in a transition metal layer along with Mn, Ni, and M. Non-limiting examples of two preferred compositions are $Na_{1.0}Li_{0.2}Ni_{0.25}Mn_{0.75}O_b$ and $Na_{0.9}Li_{0.3}Ni_{0.25}Mn_{0.75}O_b$ as described herein above.

A layered $Na_c Li_d Ni_e Mn_f M_z O_b$ generally exhibits a strongly intense (highly crystalline) (003) layering peak ($CuK\alpha$) in its X-ray Diffraction (XRD) pattern. In a preferred embodiment of this invention, the layered structure of this material has an XRD pattern that is similar to that of the reference compound, $Na_{0.7}MnO_{2+e'}$ (e'=about 0.05, Joint Committee on Powder Diffraction Standards (JCPDS) card #27-0751). The Na cations predominately are in a prismatic coordination between the close-packed, stacked oxygen anion layers, in an alternating two-layer arrangement, which can be designated as AABB packing. The Li in $Na_c Li_d Ni_e Mn_f M_z O_b$ is predominately present in the transition metal layers in the AABB packing structure.

In another preferred embodiment, the electrode, when utilized in an electrochemical cell with a lithium anode and a lithium-based electrolyte exhibits a voltage plateau at about 4.5 V, which is an indicator of lithium in the transition metal layer, by analogy to the known voltage plateau of Li cells having a layered-rock-salt $Li(Li_{0.33}Mn_{0.67})O_2$ ($Li_2MnO_3$) cathode. Other materials such as composite $xLi_2MnO_3 \cdot (1-x)LiMO_2$ (where M=Mn, Ni, Co) also exhibit voltage plateaus at about 4.5 V vs. Li metal from the $Li_2MnO_3$ component.

In a preferred embodiment of this invention the oxidation state of Mn in the $Na_c Li_d Ni_e Mn_f M_z O_b$ is close to tetravalent. Preferably, the Ni in the $Na_c Li_d Ni_e Mn_f M_z O_b$ is cycled between about Ni(II) and about Ni(IV) or oxidation states very close to these values in the preferred voltage window of approximately 2.0 to 4.2 V vs. Na metal. The Ni oxidation state is close to Ni(II) in the discharged state, and preferably Ni(IV) in the charged state, in order to maximize the capacity of the electrode and the amount of Na removed and inserted into the structure. In another embodiment of this invention, the Mn oxidation state remains about tetravalent during the first few initial cycles, which stabilizes the material. In some embodiments, the Mn becomes electroactive, demonstrating Mn(III) to Mn(IV) redox changes due to overdischarge or other processes, and therefore the capacities increase with cycling. Preferably, the Na insertion and removal from the electrode has a charge balance that is limited to a theoretical value associated with a maximal Ni(II) to Ni(IV) change and Mn(III) to Mn(IV) change. Preferably, other M (metal cation) which may be present can also undergo a redox change, therefore adding capacity, which increases the charge storage.

In a preferred embodiment, the voltage profile of an electrode of the present invention is a continuous single-phase sloping intercalation shape, which is smooth between voltage cutoffs of about 2.0 to about 4.6 V, and preferably between 2.0 to 4.2 V. The layering peaks of the XRD pattern of an electrode of the invention typically shifts slightly as a function of the state-of-charge of the electrode. A single phase is evident at about 3.4 V, 3.9 V, 4.4 V and after discharge to about 2.0 V, indicating that the $Na_cLi_dNi_eMn_fM_zO_b$ layered oxide generally retains its single phase structure during the entire charge-discharge cycle.

EXAMPLE 1

An active layered phase $Na_{1.0}Li_{0.2}Ni_{0.25}Mn_{0.75}O_b$ material was prepared by heating a mixture of about 1.37 g of $Na_2CO_3$, about 0.19 g of $Li_2CO_3$, and about 3.0 g of $Ni_{0.25}Mn_{0.75}CO_3$. The carbonates were thoroughly mixed for about 16 hours on a rotation mixer and then ground with a mortar and pestle for about 30 minutes prior to heating. The resulting powder was placed into a box furnace, and then heated to about 500° C. over about 4 hours and held there for about 9 hours. The furnace was turned off and the sample was allowed to cool to room temperature in the furnace. The resulting product was then reground and returned to the furnace. The furnace was ramped to about 800° C. over about 2 hours, and held there for about 8 hours. The 800° C. firing was repeated, and the product was furnace-cooled in the off mode. Scanning Electron Micrographs (SEM) of the resulting powdered $Na_{1.0}Li_{0.2}Ni_{0.25}Mn_{0.75}O_b$ were taken using a JEOL 7500 SEM instrument in the secondary electron imaging mode and an accelerating voltage of about 10 kV. The micrograph is shown in FIG. 1, Panel (a). The powder had a global particle size of about 5 to about 20 µm with porosity.

Figure 2:
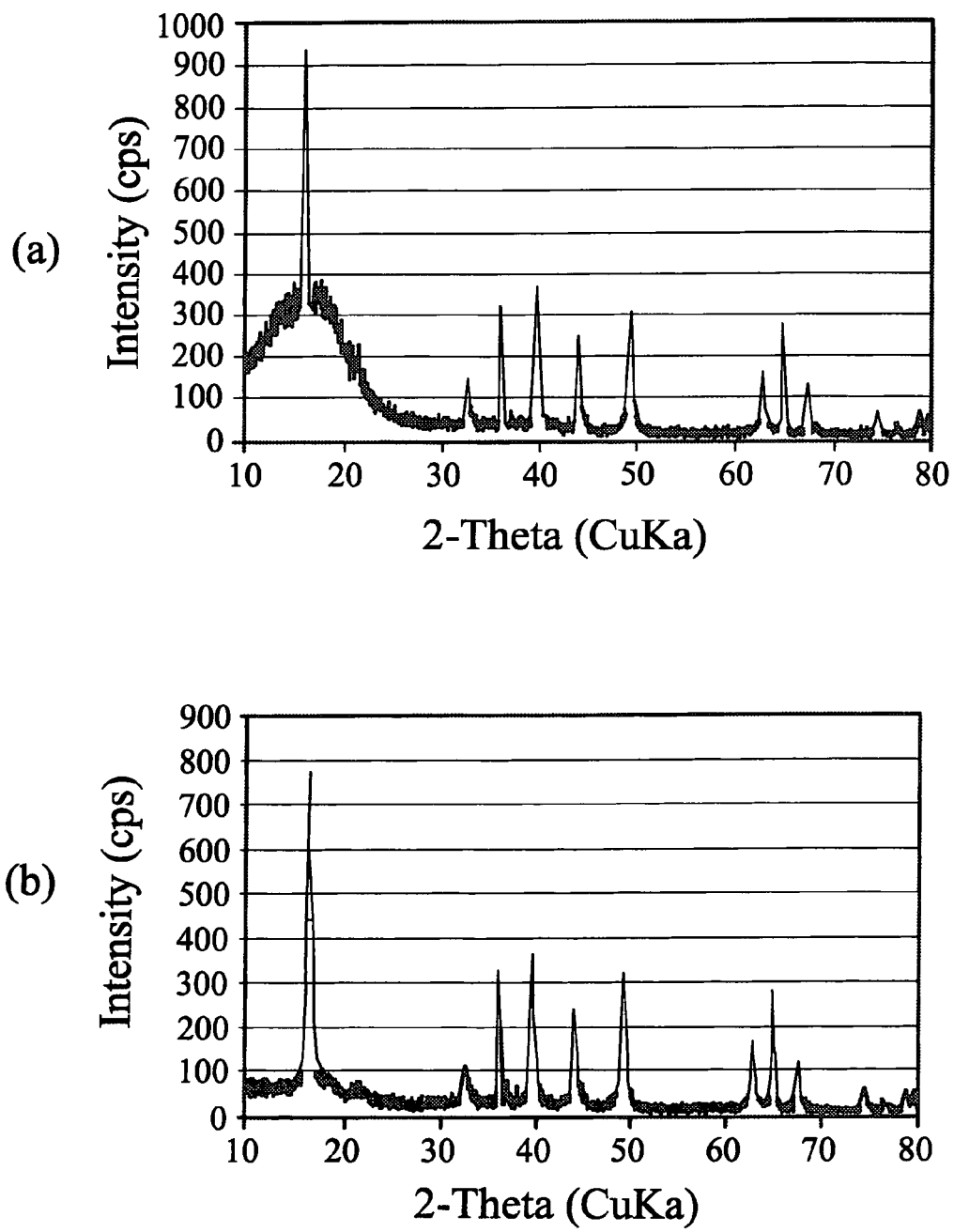
FIG. 2 depicts the X-ray diffraction patterns of (a) $Na_{1.0}Li_{0.25}Ni_{0.25}Mn_{0.75}O_b$, and (b) $Na_{0.9}Li_{0.3}Ni_{0.25}Mn_{0.75}O_b$ compounds, with the layering peak indicated.

A sample of the $Na_{1.0}Li_{0.2}Ni_{0.25}Mn_{0.75}O_b$ material was characterized by X-ray powder diffraction (XRD) using a Siemens D5000 powder diffractometer with a scan rate of about 0.6 degrees/min. The radiation was CuKα. The XRD pattern is shown in FIG. 2, Panel (a). The XRD pattern of this material is similar to the XRD of $Na_{0.7}MnO_{2+e'}$ (e'=about 0.05, Joint Committee on Powder Diffraction Standards (JCPDS) card #27-0751), indicating a layered AABB structure with sodium cations in the prismatic coordination between close-packed, stacked oxygen anion layers. The Li in the $Na_cLi_dNi_eMn_fM_zO_b$ material is predominately present in the transition metal layers in the AABB packing; see FIG. 1, Panel (b).

EXAMPLE 2

Following the reaction protocol in Example 1, $Na_{0.9}Li_{0.3}Ni_{0.25}Mn_{0.75}O_{d'}$ was prepared using the appropriate mole stoichiometries of $Na_2CO_3$, $Li_2CO_3$ and $Ni_{0.25}Mn_{0.75}CO_3$. The sample XRD is provided in FIG. 2, panel (b).

EXAMPLE 3

Figure 3:
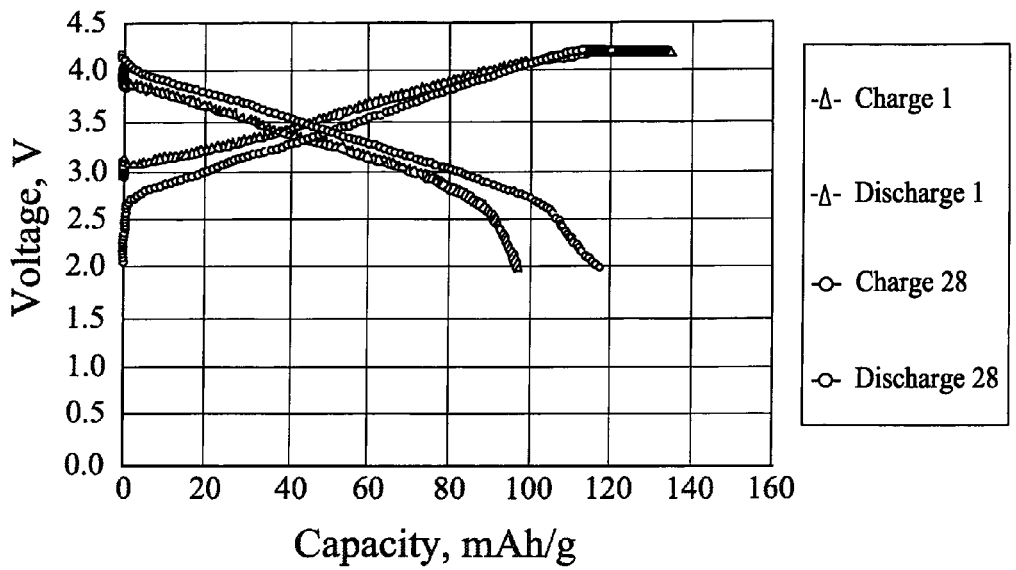
FIG. 3 depicts the first and 28th charge-discharge curves of a $Na/Na_{1.0}Li_{0.2}Ni_{0.25}Mn_{0.75}O_b$ cell over a voltage range of about 4.2 to 2.0 V vs. Na metal.

The material synthesized in Example 1 was processed into electrode laminates. Each electrode laminate was made by casting a slurry of the $Na_{1.0}Li_{0.2}Ni_{0.25}Mn_{0.75}O_b$ material onto an aluminum current collector sheet using a doctor blade. The slurry was composed of about 84 wt. % $Na_{1.0}Li_{0.2}Ni_{0.25}Mn_{0.75}O_b$ material, 8 wt. % carbon, and 8 wt. % polyvinylidene difluoride (PVDF) binder in N-methylpyrrolidinone (NMP) solvent. The wet, cast electrode laminate was dried first at about 70 to 80° C. for about 1 to 4 hours in an air oven, and then in a vacuum oven at the same temperature overnight. The electrode laminate was then calendared, and electrodes of about 9/16 inches in diameter were punched out from the aluminum sheet and built into size 2032 coin cells (Hohsen). Each coin cell contained sodium as anode and an electrolyte mixture composed of propylene carbonate (PC) solvent containing 1 M $NaClO_4$, with a Whatman GF glass filter paper separator. Cells were placed on a Maccor Series 4000 tester and cycled in galvanostatic mode at room-temperature between voltage limits of about 4.2 to 2.0 V. A trickle charge at about 4.2 V was used until the current was about a tenth of the charging current. The observed constant current rate was about 15 mA/g. The $Na/Na_{1.0}Li_{0.2}Ni_{0.25}Mn_{0.75}O_b$ cell voltage profiles for the first and 28th cycles between voltage limits of about 4.2 to 2.0 V are shown in FIG. 3.

EXAMPLE 4

Figure 6:
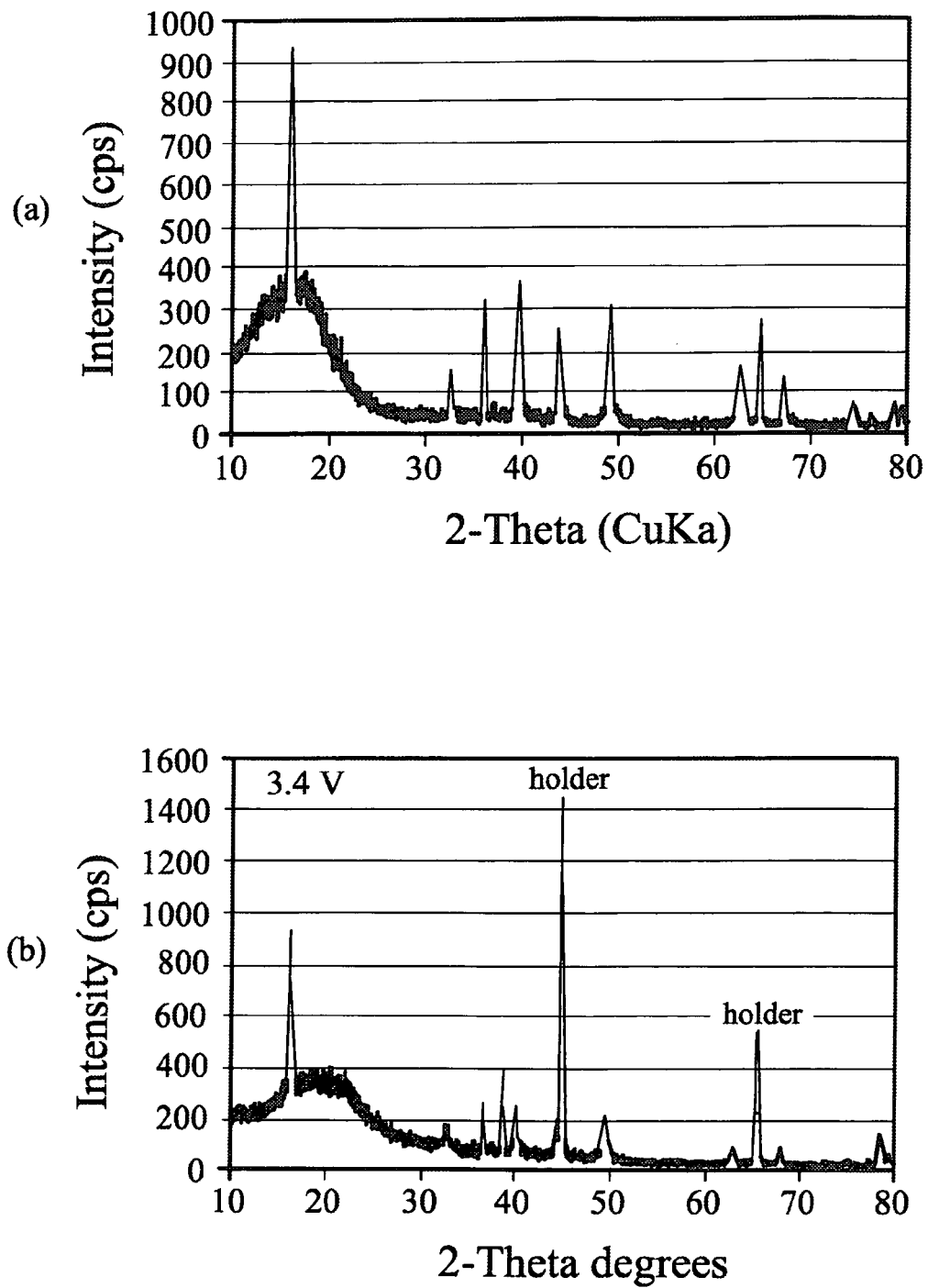
FIG. 6 depicts (a) the X-ray diffraction pattern of a $Na_{1.0}Li_{0.2}Ni_{0.25}Mn_{0.75}O_b$ electrode material laminate before cycling; (b) the X-ray diffraction pattern of the $Na_{1.0}Li_{0.2}Ni_{0.25}Mn_{0.75}O_b$ electrode material extracted from a cell after the cell reached about 3.4 V vs. Na metal; (c) the X-ray diffraction pattern of the $Na_{1.0}Li_{0.2}Ni_{0.25}Mn_{0.75}O_b$ electrode material extracted from the cell after the cell reached about 3.9 V vs. Na metal; (d) the X-ray diffraction pattern of the $Na_{1.0}Li_{0.2}Ni_{0.25}Mn_{0.75}O_b$ electrode material extracted from the cell after the cell reached about 4.4 V vs. Na metal; and (e) the X-ray diffraction pattern of the $Na_{1.0}Li_{0.2}Ni_{0.25}Mn_{0.75}O_b$ electrode material extracted from the cell after the cell was first charged to about 4.2 V vs. Na metal, and then discharged to about 2.0 V vs. Na metal.
Figure 6:
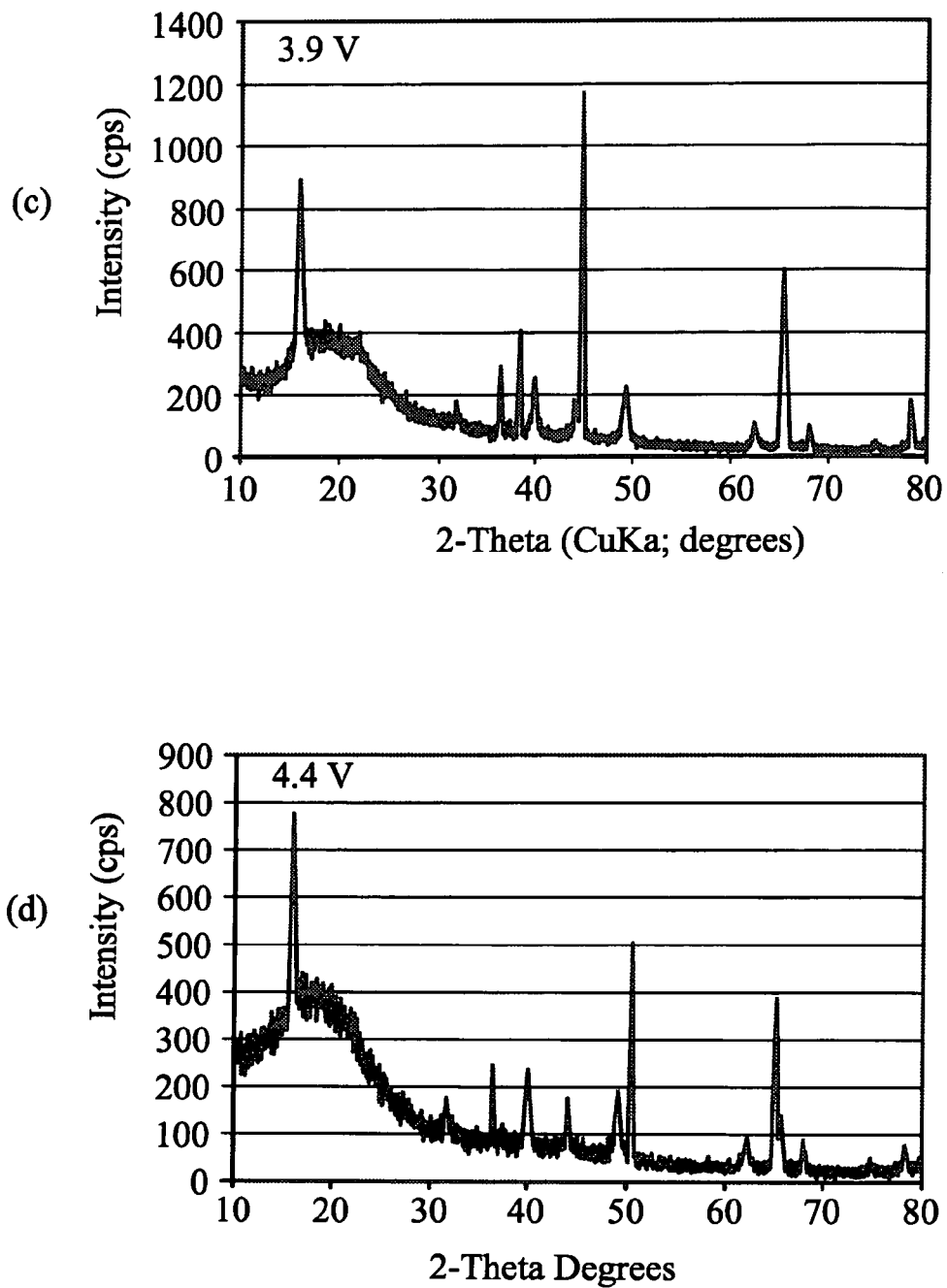
Figure 6:
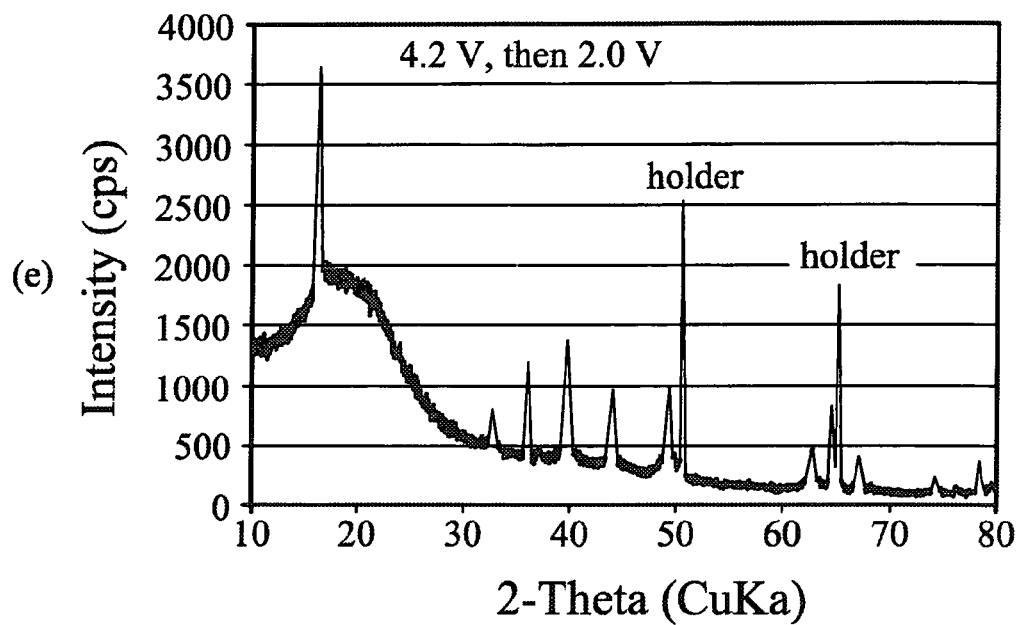

This example utilizes the electrode made in Example 3. For reference, the XRD pattern of the $Na_{1.0}Li_{0.2}Ni_{0.25}Mn_{0.75}O_b$ electrode laminate, as made, is shown in FIG. 6, Panel (a). The XRD samples were prepared by removing the electrode from the coin cell, washing copiously with dimethylcarbonate (DMC), and drying the electrode, an covering the electrode with protective Kapton tape to eliminate reaction with ambient air. FIG. 6, Panel (b) shows the XRD pattern of an electrode after charging to about 3.4 V. FIG. 6, Panel (c) shows the XRD pattern of an electrode after charging to about 3.9 V. FIG. 6, Panel (d) shows the XRD pattern of an electrode after charging to about 4.4 V. FIG. 6, Panel (e) shows the XRD pattern of an electrode after charging to about 4.4 V and discharging to about 2.0 V. As is clear from the XRD patterns, there is little or no change in the patterns after the charging and the discharging, other than a shift in the peak positions in response to the state-of-charge of the electrode, and the quantity of Na that resides in the structure. In this example, the material shows single phase intercalation behavior. The layering peak is moves within the range of about 15.3 to 17.5 degrees 2-theta (CuKα).

EXAMPLE 5

Figure 4:
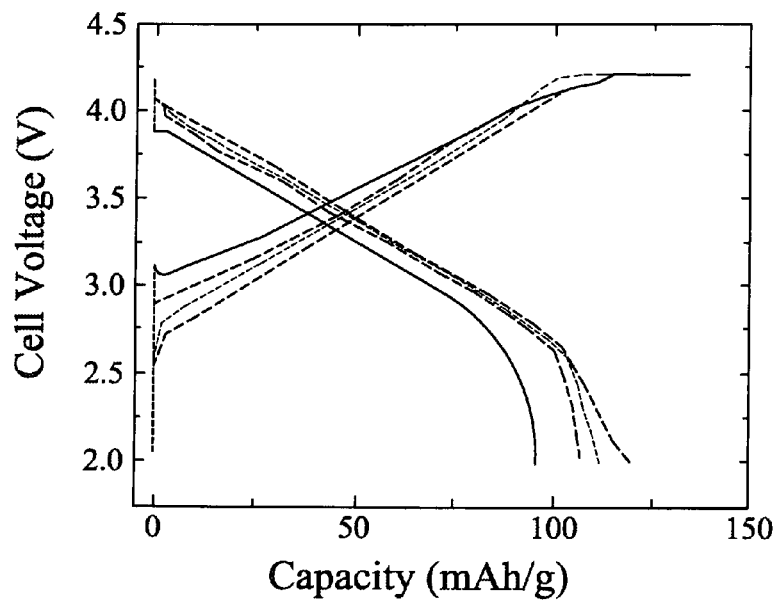
FIG. 4 depicts the 1st (solid), 10th (dash), 20th (dot), and 30th (dash-dot) cycle charge-discharge curves of a $Na/Na_{0.9}Li_{0.3}Ni_{0.25}Mn_{0.75}O_b$ cell over a voltage range of about 4.2 to 2.0 V vs. Na metal.

The material synthesized in Example 2 was made into electrode laminates and then Na coin cells were built as described in Example 3. The voltage profile of a typical $Na/Na_{0.9}Li_{0.3}Ni_{1/4}Mn_{3/4}O_b$ cell between about 4.2 and 2.0 V vs. Na metal, at a current rate of 15 mA/g, is shown in FIG. 4 for the 1st (solid), 10th (dash), 20th (dot), and 30th (dash-dot) cycles.

Figure 5:
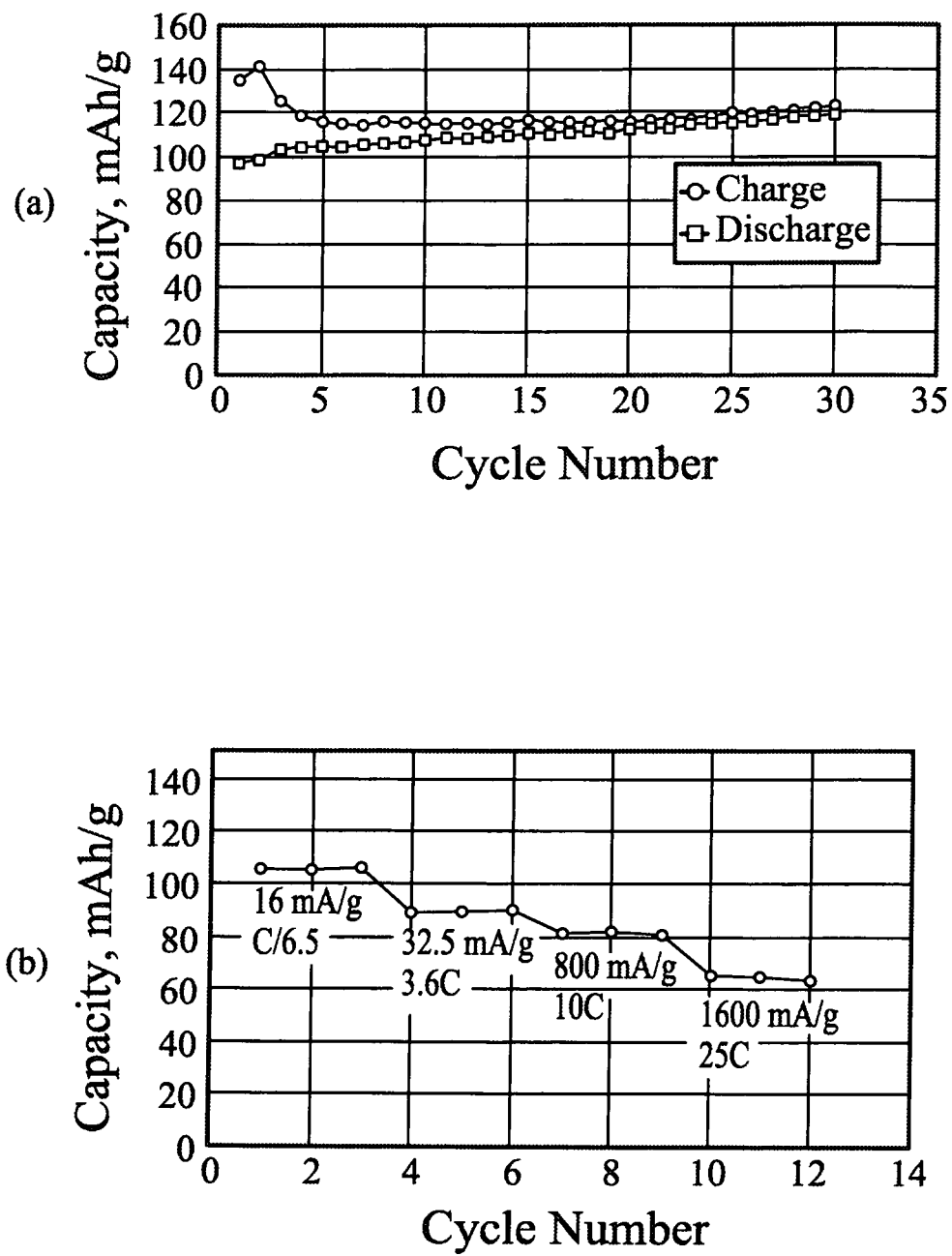
FIG. 5 depicts (a) the discharge capacity values for thirty cycles of a $Na/Na_{0.9}Li_{0.3}Ni_{0.25}Mn_{0.75}O_b$ cell over a voltage range of 4.2 to 2.0 V vs. Na metal; (b) a plot of the rate capability of the $Na/Na_{0.9}Li_{0.3}Ni_{0.25}Mn_{0.75}O_b$ cell, at current density as specified in the plot.

The discharge capacity for 30 cycles is shown in FIG. 5, Panel (a). The observed capacity was initially about 97 mAh/g and increased to about 119 mAh/g, thus demonstrating stability and reversibility.

The electrode of this example was tested at different discharge current rates, between a charge voltage cutoff of about 4.2 V vs. Na metal, and a discharge voltage cutoff of about 2.0 V vs. Na metal. The various current rates are marked in the FIG. 5, panel (b), which shows the capacity that results from the $Na/Na_{0.9}Li_{0.3}Ni_{0.25}Mn_{0.75}O_b$ cell. Notably, at a current density rate of about 1600 mA/g, the capacity was about 65 mAh/g, thus demonstrating good power capability.

EXAMPLE 6

X-ray absorption near-edge XANES experiments were performed in the Sector 20, bending magnet beamline (PNC/XSD, 20-BM) of the Advanced Photon Source at Argonne National Laboratory in order to determine oxidation state of Mn for the as-prepared, charged, and discharged electrode materials. Measurements at the Mn K-edge were performed in the transmission mode at room temperature using gas ionization chambers to monitor the incident and transmitted x-ray intensities. A third ionization chamber was used in conjunction with a Mn-foil standard to provide internal calibration for the alignment of the edge position. Monochromatic X-rays were obtained using a fixed-exit Si (111) double crystal monochromator. The monochromator energy was calibrated using a Mn foil spectrum, and setting the inflection point (first derivative maxima at the edge) to about 6537.7 eV for Mn. A rhodium-coated X-ray mirror was used to suppress higher order harmonics. Care was taken to minimize distortions of the spectra from thickness effects. Data reduction was carried out using XAS analysis software developed by Ravel and Newville [19].

Figure 7:
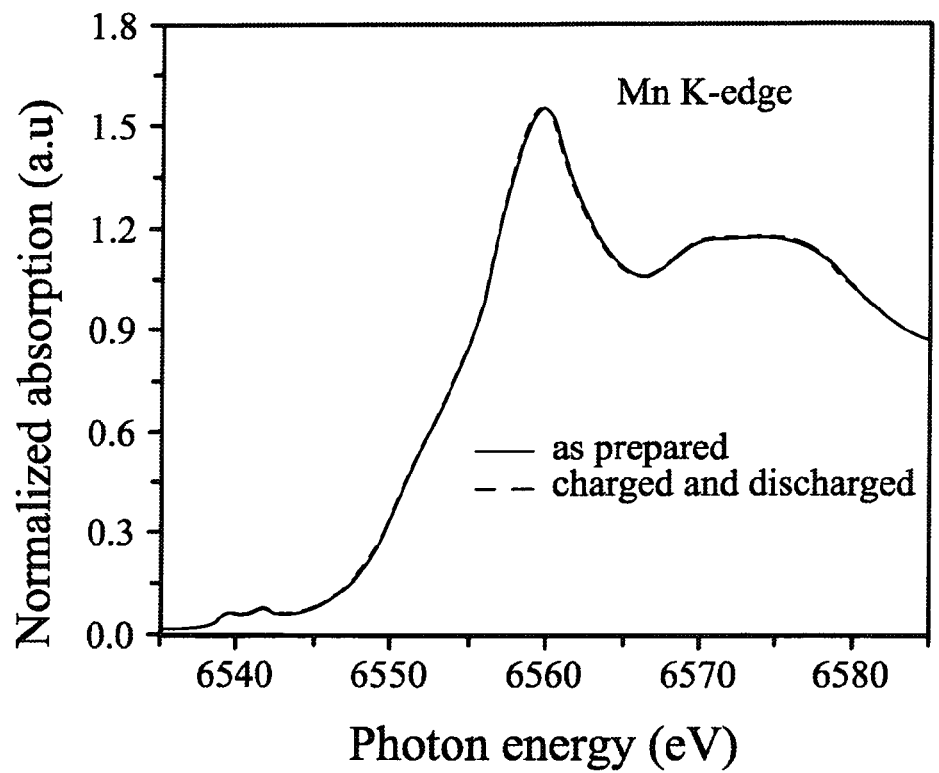
FIG. 7 depicts the X-ray absorption near-edge spectrum of Mn in the $Na_{0.9}Li_{0.3}Ni_{0.25}Mn_{0.75}O_b$ material as-prepared (solid line), and after being charged to about 4.2 V and then discharged to about 2.0 V (dashed line) vs. Na metal.

The Mn K-edge spectrum of an electrode of Example 3 comprising $Na_{1.0}Li_{0.2}Ni_{0.25}Mn_{0.75}O_b$ was measured in an as-prepared state is shown in FIG. 7 (solid line). The electrode was sealed in an aluminum pouch to protect it from atmosphere prior to obtaining the spectrum. The as-prepared $Na_{1.0}Li_{0.2}Ni_{0.25}Mn_{0.75}O_b$ electrode material had a Mn oxidation state of Mn(IV) based on the spectrum. In a separate experiment, an electrode of the same construction was charged to about 4.2 V then discharged to 2.0 V at a current rate of about 15 mA/g following the protocol in example 3. The electrode removed from the cell, washed copiously with dimethylcarbonate (DMC), dried, and sealed in an aluminum pouch. The spectrum of the discharged electrode (2.0 V vs. Na) is shown in FIG. 7 (dotted line), which still indicates a Mn(IV) or nearly Mn(IV) oxidation state. Assuming that the Ni in the electrode is divalent, and knowing the stoichiometry of the material (Mn/Ni=3; Li+Na=1.2, Li+Na/Ni+Mn=1.2) and that the oxidation state of the Mn is tetravalent a composition of $Na_{0.85}Li_{0.17}Ni_{0.21}Mn_{0.64}O_2$, was deduced. The specific capacity of the electrode material for oxidation state change of Ni(II) to Ni(IV) was about 112.4 mAh/g.

EXAMPLE 7

Figure 8:
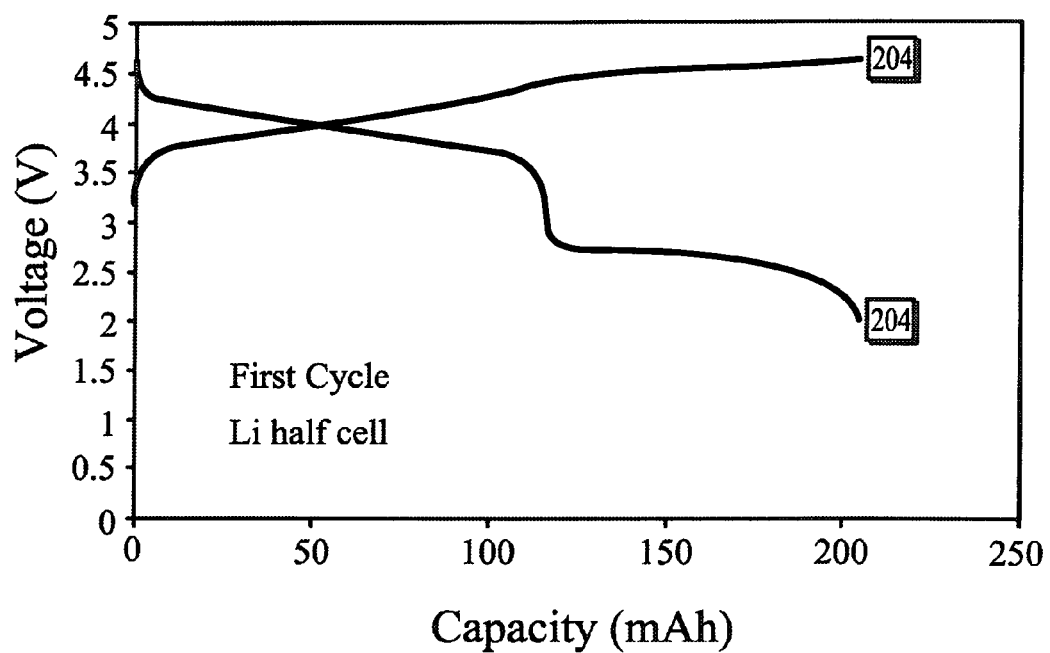
FIG. 8 depicts the first charge-discharge voltage profiles of a $Li/Na_{1.0}Li_{0.2}Ni_{0.25}Mn_{0.75}O_b$ cell comprising 3:7 EC:EMC and 1.2 M $LiPF_6$ as the lithium electrolyte, and Li metal foil as the anode. The voltage limits were about 4.6 to 2.0 V, and the current was about 15 mA/g.

This example utilized the electrode made in Example 3; however, the electrolyte and the anode were 3:7 EC:EMC, 1 M $LiPF_6$, (lithium battery electrolyte) and Li metal, respectively. The first charge-discharge voltage profile of the $Li/Na_{1.0}Li_{0.2}Ni_{0.25}Mn_{0.75}O_b$ is shown in FIG. 8. The voltage plateau at about 4.5 V vs. Li is indicative of Li cations in the transition metal layer, and thus can be used as confirmation of the location of Li in $Na_{1.0}Li_{0.2}Ni_{0.25}Mn_{0.75}O_b$.

Figure 9:
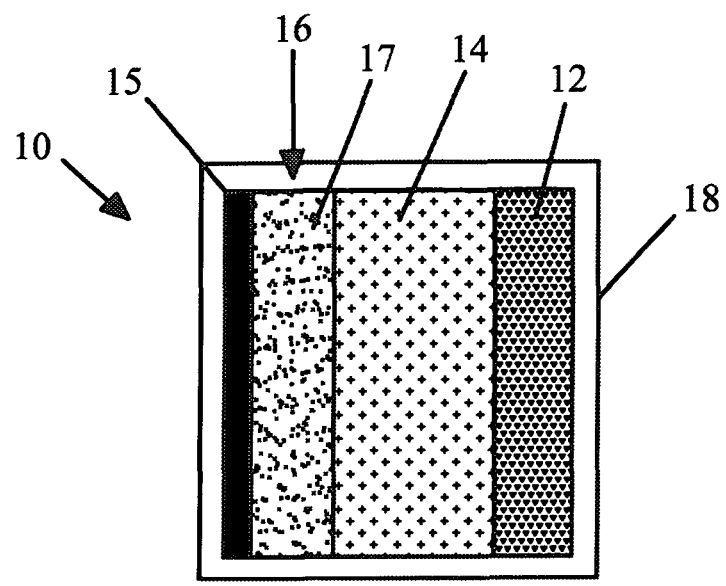
FIG. 9 depicts a schematic representation of an electrochemical cell of the invention.
Figure 10:
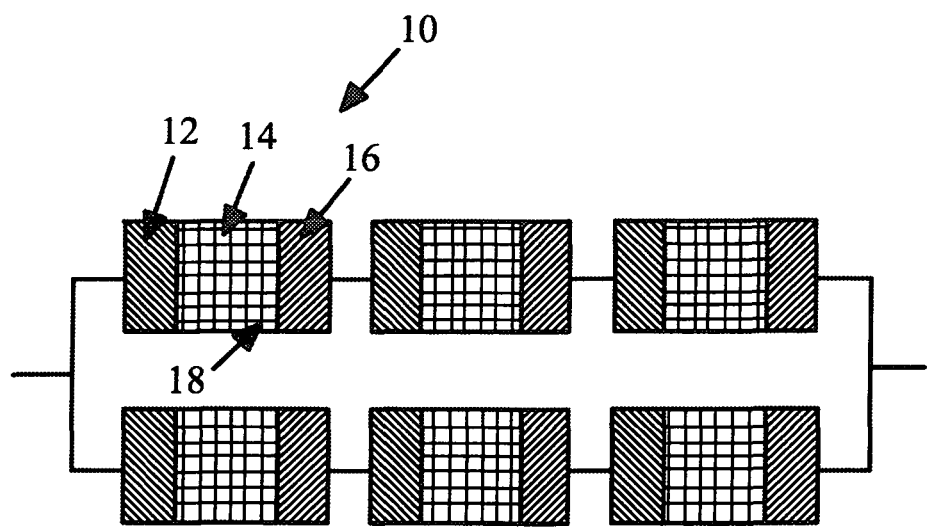
FIG. 10 depicts a schematic representation of a battery consisting of a plurality of cells of the invention connected electrically in series and in parallel.

A detailed schematic illustration of a sodium cell 10 of the invention shown in FIG. 9. Cell 10 comprises negative electrode 12 separated from positive electrode 16 by an electrolyte 14, all contained in insulating housing 18 with suitable terminals (not shown) being provided in electronic contact with negative electrode 12 and positive electrode 16. Electrode 16 comprises metallic collector plate 15 and active layer 17 comprising $Na_cLi_dNi_eMn_fM_zO_b$. Binders and other materials normally associated with both the electrolyte and the negative and positive electrodes are well known in the art and are not described herein, but are included as is understood by those of ordinary skill in this art. FIG. 10 provides a schematic illustration of one example of a battery in which two strings of electrochemical sodium cells 10, described above, are arranged in parallel, each string comprising three cells 10 arranged in series.

While there has been disclosed what is considered to be the preferred embodiments of the present invention, it is understood that various changes in the details may be made without departing from the spirit, or sacrificing any of the advantages of the present invention and that additional improvements in the capacity and stability of the electrodes can be expected to be made in the future by improving and optimizing the composition of the sodium-lithium-metal-oxide electrode structures and the processing techniques whereby the electrodes are constructed and used in electrochemical cells.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

References

[1] World Wide Website evworld.com/article.cfm?storyid=1180.
[2] J. Barker et al., Electrochem. and Solid State Lett., 6 (2003) A1.
[3] J. Barker et al. J. Electrochem. Soc., 151 (2004) A1670.
[4] B. L. Ellis, et al., Chem. Mat. 22 (2010) 1059.
[5]. Recham et al., J. Electrochem. Soc., 156 (2009) A993.
[6] Komaba, et al. Electrochem. Commun., 12 (2010) 355.
[7] J. S. Kim, et al. J. Power Sources, 178 (2008) 852.
[8] Y. Uebou et al., J. Power Sources, 115 (2003) 119.
[9] M. Nishijima, et al., J. Power Sources, 190 (2009) 558.
[10] K. West et al., Solid State Ionics, 28 (1988) 1128.
[11] T. Shiratsuchi et al., J. Power Sources, 159 (2006) 268.

[12] Z. H. Lu, and J. R. Dahn, J., Electrochem. Soc., 148 (2001) A1225.
[13] M. M. Doeff et al., J. Electrochem. Soc. 141 (1994) L145.
[14] A. Caballero, et al., J. Solid State Chem., 174 (2003) 365.
[15] A. Caballero, et al., J. Mater. Chem., 12 (2002) 1142.
[16] Yoon-W.-S, et al., Electrochem. Solid State Letters, 7 (2004) A167.
[17] Whittingham, M. S., Chemistry Reviews 104 (2004) 4271.
[18] Ravel, B.; Newville, M. J., ATHENA, ARTEMIS, HEPHAESTUS: data analysis for X-ray absorption spectroscopy using IFEFFIT. Synch. Radiation 12 (2005) 1537.

The embodiments of the invention in which an exclusive property or privilege is claimed are defined as follows:

1. An electrode suitable for use as a cathode in a sodium electrochemical cell or battery, the electrode comprising a layered material of formula $Na_cLi_dNi_eMn_fM_zO_b$, wherein M comprises one or more metal cation, $0.24 \leq c/b \leq 0.5$, $0 \leq d/b < 0.23$, $0 \leq e/b \leq 0.45$, $0 \leq f/b \leq 0.45$, $0 \leq z/b \leq 0.45$, the combined average oxidation state of the metallic components Na, Li, Ni, Mn, and M is in the range of about 3.9 to 5.2, and b is equal to $(c+d+Ve+Xf+Yz)/2$, wherein V is the average oxidation state of the Ni, X is the average oxidation state of the Mn, and Y is the average oxidation state of the M; and wherein a combined positive charge of the metallic components is balanced by a combined negative charge of the oxygen anions, the Na is predominately present in a sodium layer, and the Mn, Ni, and M are predominately present in a transition metal layer.

2. The electrode of claim 1 wherein $c/b \leq 0.4$, and $(e+f+z)/(c/b)$ is about 2.5; and c/b is not less than 0.24.

3. The electrode of claim 1 wherein M comprises one or more monovalent, divalent, trivalent, or tetravalent cation.

4. The electrode of claim 1 wherein, z/b is 0, (c+d)/b is about 0.51, and (e+f)/b is about 0.42.

5. The electrode of claim 1 wherein f/b is 0.

6. The electrode of claim 1 wherein the Li is predominantly present in the transition metal layer.

7. The electrode of claim 1 wherein M comprises at least one cation selected from The group consisting of $Mg^{2+}$, $Co^{2+}$, $Co^{3+}$, $B^{3+}$, $Fe^{2+}$, $Fe^{3+}$, $Ga^{3+}$, $Al^{3+}$, and $Ti^{4+}$.

8. The electrode of claim 1 wherein the $Na_cLi_dNi_eMn_fM_zO_b$ has a structure in which Li clusters with Ni and/or Mn in the transition metal layer.

9. The electrode of claim 1 wherein the Na in the sodium layer has predominately trigonal prismatic coordination, and the Li predominantly is present in the transition metal layer.

10. The electrode of claim 1 wherein the ratio f/e is about 3, c/d is about 5 or about 3, and (c+d)/e+f) is about 1.2.

11. The electrode of claim 10 wherein the oxidation state of Mn in the $Na_cLi_dNi_eMn_fM_zO_b$, as determined by a X-ray absorption near-edge spectrum (XANES), is about (IV).

12. The electrode of claim 10 wherein the oxidation state of Mn in the $Na_cLi_dNi_eMn_fM_zO_b$, as determined by a X-ray absorption near-edge spectrum (XANES), is about (IV) after a charge to about 4.2 V vs. Na metal, followed by a discharge to 2.0 V vs. Na metal, in a sodium electrochemical cell.

13. The electrode of claim 10 wherein a charge-discharge profile of the electrode exhibits a plateau at about 4.5 V when used as the cathode in an electrochemical cell comprising a Li metal anode and an electrolyte comprising 1.2 M $LiPF_6$ in a mixture of ethylenecarbonate (EC) and ethylmethylcarbonate (EMC) in a weight ratio of about 3:7 EC:EMC.

14. The electrode of claim 1 wherein the $Na_cLi_dNi_eMn_fM_zO_b$ exhibits a layering peak in the X-ray diffraction (XRD) pattern thereof.

15. The electrode of claim 1 wherein the $Na_cLi_dNi_eMn_fM_zO_b$ has a repeating AABB layered, oxygen close-packed stacking structure.

16. The electrode of claim 1 wherein the $Na_cLi_dNi_eMn_fM_zO_b$ is present within a layer or coating on a metallic substrate.

17. An electrochemical cell comprising an anode, an electrode of claim 1 as a cathode, and a sodium-containing electrolyte therebetween.

18. The electrochemical cell of claim 17 wherein the anode comprises sodium metal.

19. An electrochemical cell comprising an anode, an electrode of claim 11 as a cathode, and a sodium-containing electrolyte therebetween.

20. The electrochemical cell of claim 19 wherein the anode comprises sodium metal.

21. A battery comprising a plurality of electrochemical cells of claim 17 arranged in series, parallel, or both.

22. A battery comprising a plurality of electrochemical cells of claim 19 arranged in series, parallel, or both.

* * * * *

UNITED STATES PATENT AND TRADEMARK OFFICE
CERTIFICATE OF CORRECTION

| | | |
|---|---|---|
| PATENT NO. | : 8,835,041 B2 | Page 1 of 1 |
| APPLICATION NO. | : 13/006512 | |
| DATED | : September 16, 2014 | |
| INVENTOR(S) | : Johnson et al. | |

It is certified that error appears in the above-identified patent and that said Letters Patent is hereby corrected as shown below:

IN THE CLAIM

Column 11, claim 1, lines 19-20, delete "$0 \leq d/b < 0.23$" and insert --$0 < d/b \leq 0.23$--.

Signed and Sealed this
Second Day of December, 2014

Michelle K. Lee
*Deputy Director of the United States Patent and Trademark Office*